United States Patent Office 2,799,468
Patented July 16, 1957

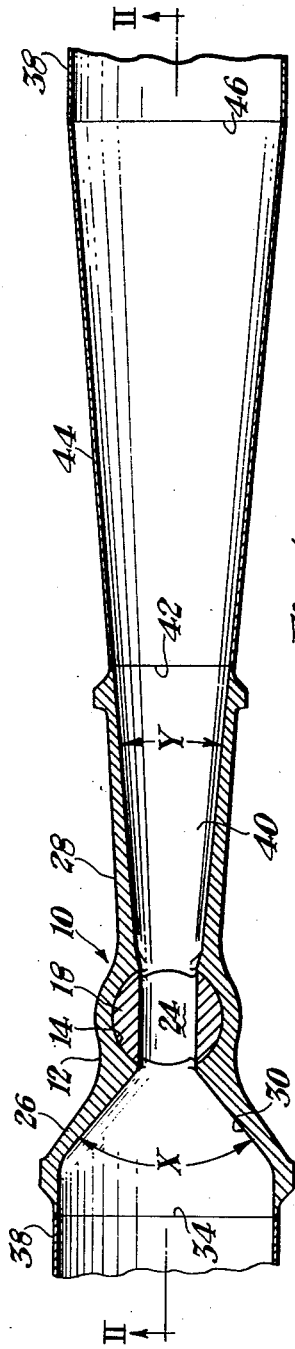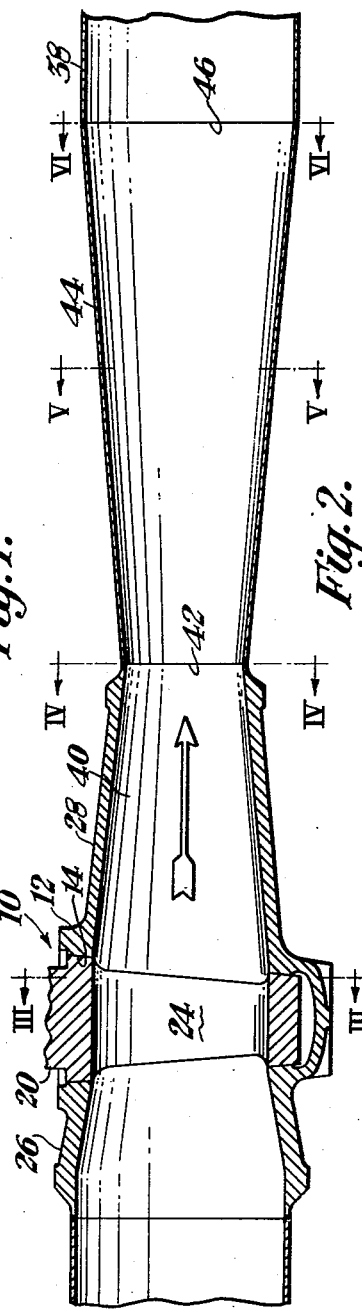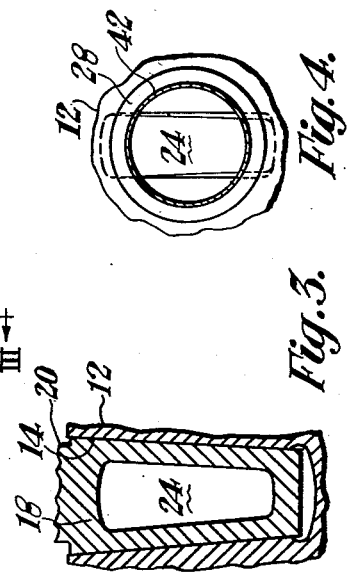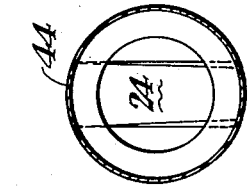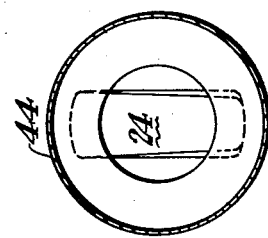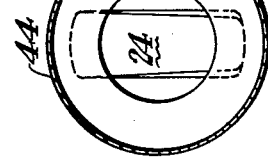
INVENTOR.
Frank M. VanDeventer
BY
HIS ATTORNEY

2,799,468

VALVES

Frank M. Van Deventer, Westfield, N. J., assignor to Walworth Company, Boston, Mass., a corporation of Massachusetts Application January 19, 1951, Serial No. 206,821

6 Claims. (Cl. 251—124)

This invention relates to valves and, more particularly, to plug valve assemblies for pressure recovery purposes and is a continuation-in-part of my copending application Serial No. 25,002, filed May 4, 1948, now Patent No. 2,717,758 granted September 13, 1955.

In the conventional design of plug valves, the relatively abrupt enlargement of flow area from the plug to the downstream port of the valve necessarily involves a pressure drop in the fluid being conveyed therethrough. Such pressure drop becomes cumulative in long pipe lines where a multiplicity of plug valves is installed at intervals in the line. This reduces the amount of fluid which can be transported through a given size pipe and necessitates an increase in the power required to force a given quantity of fluid through the line.

The problem has been accentuated over a period of years due to the development of larger and larger pipe lines, particularly for cross-country use. The increased cost of valves comparable in size to such lines has led to the use of smaller valves in an endeavor to reduce the overall capital investment. Consequently, a considerable increase in pressure loss as compared to that through full size valves has been encountered. This has restricted the usefulness of plug valves despite definite advantages which this type of valve possesses; one particular advantage being that plug valves readily lend themselves to the application of lubricating principles which are now embodied in the well-known lubricated plug valve.

In the said copending application, a rotatable plug member engages the seating surface of the valve casing and is provided with a port of substantailly rectangular cross-section. The casing has an inlet on one side of the plug member having a tapered opening of approximately 40° included angle converging for registry with the port. An outlet is positioned in the casing on the opposite side of the plug member and has a tapered opening of substantially rectangular cross-section diverging from registry with the port. The outlet has an included angle in its major dimension of approximately 10°. The center-to-face dimensons of the inlet and outlet sides of the valve casing are approximately the same.

The pressure recovery tube of the copending application is connected at one end to the larger end of the outlet and is adapted at its opposite end for connection to the opposite end of the pipe line. Necessarily, the recovery tube has a generally rectangular cross-section at the one end and a circular cross-section at the opposite end. The contour of the tube thus merges from the generally rectangular small end to the circular large end and requires special fabrication from metal plate. Moreover, reinforcing ribs are required to supplement the normal strength of the metal plate in this prior construction.

The present disclosure involves a valve casing wherein the inlet is constructed as in the prior disclosure, but the outlet is extended to a greater length so that the center-to-face dimensions differ. The outlet end is of sufficient length so that the juncture with the recovery tube is of circular form. The tube may thus be fabricated in the shape of a true frustum of a cone. Thus, the manufacturing cost is greatly lessened and the reinforcing ribs may be dispensed with.

Other objects and advantages include a substantial reduction in pressure loss through the valve; the ability to use valves of smaller rated size than the pipe line; the retention of the conventional form of port opening; the effective utilization of the increase in velocity which accompanies pressure drop to produce a pressure recovery; the increase in the conversion of the velocity into pressure to a substantially high efficiency; and the combination of slight structural changes in the plug valve with corresponding changes in the adjacent pipe line section to produce a high overfall efficiency.

Other objects and advantages will become apparent from the following description taken in connection with the accompanying drawings wherein:

Fig. 1 is a longitudinal sectional plan view of a plug valve and pipe line assembly embodying the invention.

Fig. 2 is a longitudinal sectional elevation corresponding to Fig. 1; and

Figs. 3 through 6 are cross-sectional views on lines III—III through VI—VI respectively of Fig. 2.

Referring more particularly to the drawing, the plug valve element of this invention is shown as comprising a lubricated plug valve 10 of conventional form but modified slightly as will appear hereinafter. The plug valve 10 comprises a casing 12 having a seating surface 14 therein which may be of conical form and provided with lubricating grooves (not shown) as is customary. A rotatable plug member 18 is positioned in the casing 12 and may be of conical form for cooperation with the seating surface 14.

The plug member 18 is provided with a stem 20, shown partly broken away in Fig. 2, by means of which it can be rotated through an angle of approximately 90° defining the open and closed positions of the valve. The remaining portions of conventional lubricated plug valves are well-known and further description is deemed unnecessary.

The plug member 18 is provided with a port 24 extending therethrough and which is generally rectangular or, more specifically, of trapezoidal form as indicated in Fig. 3. When the plug member 18 is in the open position shown in Fig. 1, fluid is admitted thereto from an inlet 26 and is conveyed therefrom by an outlet 28 which openings are positioned respectively on the casing 12 on opposite sides of the plug member 18. In this embodiment of the invention, the inlet 26 is of conventional form and requires no changes to adapt it for accomplishing the principles of the invention. However, the outlet 28 is modified from the conventional form and thereby the objects and advantages of this invention are achieved.

Accordingly, the inlet 26 is of hollow, tapered construction having a tapered opening 30 which converges from the outer end of the inlet 26 for registry with the adjacent end of the port 24 in the plug member 18. The included angle "X" of the tapered opening 30 is usually 80 degrees or more and, as will appear hereinafter is therefore more obtuse than that of the outlet 28. The opening 30 preferably merges from a trapezoidal form at its inner or smaller end conforming to the shape of the port 24 into a substantially circular opening 34 at its outer or larger end as indicated in Fig. 1. The outer end 34 of the inlet 26 terminates in a welding portion which is shown as welded to a pipe section 38. Consequently, the diameter of the circular outer end portion 34 is substantially equal to that of the pipe section 38. As previously mentioned, the inlet 26 is of generally conventional form and consequently an abrupt change from one area to another occurs in the fluid passing from the pipe section 38 through the inlet 26 to the port 24. It will be apparent that when a similar abrupt change occurs in a reverse direction, such as when the fluid emerges from the port 24 into a conventional outlet, there is a considerable restriction of flow area in the central portion of the valve body which bears some resemblance to a Venturi tube. However, only a slight loss occurs in the converging or inlet channel and some of the fluid pressure is converted into velocity of the fluid.

This invention is more particularly concerned with recovery of fluid pressure. It is well-known that the effectiveness of reconversion of velocity into pressure in the downstream channel of a Venturi tube depends upon the difference in flow area at the throat as compared to the area at the mouth; but, more importantly, it depends upon the angle between the sides of the flow channel. When this angle is 80° or more, as in the case of conventional valves, the loss due to turbulence and shock is as great as though the change in section were an "abrupt enlargement," i. e., an immediate change from one area to a larger area. In this invention, certain changes have been made in the outlet port of the otherwise conventional valve but in combination with supplementary structure also to be described. The combination provides a continuous flow channel beginning at the valve plug member 18 of such proportions as to accomplish a highly efficient conversion of the velocity into pressure.

To this end, the outlet 28 of hollow, tapered construction is provided with a tapered opening 40 which diverges from registry with the port 24. The inner end of the outlet opening 40 conforms in cross-section to the trapezoidal shape of the port 24. The outer end 42 of the outlet opening 40 is substantially circular as in the case of the outer end 34 of the inlet opening 30, but the diameter of the outer end 42 is approximately one half the diameter of the outer end 34. Specifically, the included angle "Y" of the opening 40 should be approximately 10° as shown in the horizontal section, Fig. 1. It will be observed that in the vertical section, Fig. 2 the sides of the outlet opening 40 converge toward the outer end 42 thereof. The convergence may or may not be required depending upon the selected diameter of the discharge opening and the selected center-to-face dimension of the outlet opening 40.

As in the case of the inlet 26, the outlet 28 terminates in a welding end connection at the outer end 42 which is shown as welded to one end of a tubular pipe section 44. The tube 44 is of frustro-conical form having an included angle of approximately 10° to form an extension of the outlet opening 40. The outer end 46 of the tube 44 preferably has a diameter approximately equal to the diameter of the outer end 34 of the inlet opening 30. Consequently, a section of the pipe 38 may be secured as by welding to the end face 46. As shown in the sectional views Figs. 4, 5 and 6, the tubular pipe section 44 forms a true frustum of a cone since the various diameters along its length are substantially circular.

As will be apparent, the pipe line 38 has a cross-sectional area substantially in excess of that of the port 24. Since one of the important advantages of the invention is that it permits the economical use of valves of smaller size than the pipe line, such reduction in cross-sectional area may be intentional. For example, with a thirty-inch diameter pipe line 38 there could be used a valve with a standard so-called twenty-four inch plug member 18. In such event, the down-stream end or outlet 28 is increased in length so as to merge from the usual trapezoidal shape at the plug port 24 to a circular cross-section having an internal diameter of approximately sixteen inches. Inasmuch as it has been stated that the included angle approximates 10°, the center-to-face dimension of the outlet 28 in the example is forty-six inches, which dimension results in an included angle of 11° plus. In any event, the outlet 28 will have a center-to-face dimension substantially greater than that of the inlet 26.

It will be understood that valves with one or more flanged ends for bolting to the pipe line could equally well be used in place of the welding end valve shown and described herein. These and other modifications and changes in the arrangement and combination of parts and in the details of construction can be made without departure from the scope of the invention as defined in the appended claims.

I claim:

1. A plug valve assembly adapted for insertion between the ends of a pair of oppositely disposed tubular pipe sections comprising a valve casing having opposite end portions, one of said casing portions defining an inlet passage converging in one direction to a tapered valve seat from substantially the diameter of one of the pipe sections with which it is adapted to be associated, the other of said casing portions including an outlet passage extending in an opposite direction from said valve seat, a tapered plug valve member cooperable with said seat and having a port of substantially rectangular cross section, said passages having at least the portions thereof adjacent the valve seat formed of substantially rectangular cross section with which said plug port is adapted to register to form a supplemental connecting conduit in the open position of said valve member, said outlet passage diverging along at least the minor dimension thereof to the terminus of said other casing portion and terminating in an outlet port of generally circular cross section having a cross sectional area substantially less than the cross sectional area of the inlet opening of said one casing portion, and a frustro-conical pipe section positioned at said outlet port of said outlet passage and engaging at its smaller end with said other casing portion, said pipe section having an included angle of approximately ten degrees and being adapted to be connected at the larger end thereof to the other of the tubular pipe sections.

2. A plug valve assembly as claimed in claim 1 wherein the included angle in the plane of the minor axes of serial cross sections of said outlet passage is approximately ten degrees.

3. A plug valve assembly as claimed in claim 2 wherein said outlet passage converges along the major dimension thereof.

4. A plug valve comprising a valve casing having opposite end portions, one of said casing portions defining an inlet passage converging from an inlet port to a tapered valve seat, the other of said casing portions including an outlet passage extending from said valve seat, a tapered plug valve member cooperable with said seat and having a port of substantially rectangular cross section, said passages having at least the portions thereof adjacent the valve seat formed of substantially rectangular cross section with which said plug port is adapted to register to form a supplemental connecting conduit in the open position of said valve member, said outlet passage diverging along at least the minor dimension thereof to the terminus of said other casing portion and terminating in an outlet port of generally circular cross section having a cross sectional area substantially less than the cross sectional area of said inlet port in said one casing portion.

5. A plug valve as claimed in claim 4 wherein the included angle in the plane of the minor axes of serial cross sections of said outlet passage is approximately ten degrees.

6. A plug valve as claimed in claim 5 wherein said outlet passage converges along the major dimension thereof.

(References on following page)

References Cited in the file of this patent

UNITED STATES PATENTS

| | | |
|---|---|---|
| 842,393 | De Ferranti | Jan. 29, 1907 |
| 1,161,460 | Doble | Nov. 23, 1915 |
| 1,249,601 | De Ferranti | Dec. 11, 1917 |
| 1,522,490 | Borden | Jan. 13, 1925 |
| 2,421,879 | Hamer | June 10, 1947 |

FOREIGN PATENTS

| | | |
|---|---|---|
| 28,193 | Great Britain | Dec. 2, 1909 |
| 422,829 | France | Mar. 31, 1911 |
| 339,889 | Great Britain | Dec. 18, 1930 |

OTHER REFERENCES

A. S. M. E. Research Publication, Fluid Meters (137–714).

Text on Hydraulics (4th ed.). (Copy in Library of Congress.)

Text on Hydraulics, by Hughes and Safford, pp. 225–227. (Copy in Division 39.)